United States Patent
Lee et al.

(10) Patent No.: US 9,508,143 B2
(45) Date of Patent: Nov. 29, 2016

(54) APPARATUS AND METHOD FOR MARKING REGION OF INTEREST

(71) Applicant: Samsung Electronics Co., Ltd., Suwon-si (KR)

(72) Inventors: Chon Hee Lee, Nonsan-si (KR); Yeong Kyeong Seong, Yongin-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 120 days.

(21) Appl. No.: 14/585,840

(22) Filed: Dec. 30, 2014

(65) Prior Publication Data

US 2015/0187071 A1    Jul. 2, 2015

(30) Foreign Application Priority Data

Jan. 2, 2014 (KR) .................. 10-2014-0000321

(51) Int. Cl.
| | | |
|---|---|---|
| *G06K 9/00* | (2006.01) | |
| *G06T 7/00* | (2006.01) | |
| *G06T 15/00* | (2011.01) | |
| *G06K 9/46* | (2006.01) | |
| *G06T 19/00* | (2011.01) | |

(52) U.S. Cl.
CPC .............. *G06T 7/0012* (2013.01); *G06K 9/46* (2013.01); *G06T 7/0081* (2013.01); *G06T 15/00* (2013.01); *G06T 19/00* (2013.01); *G06K 2009/4666* (2013.01); *G06T 2210/41* (2013.01)

(58) Field of Classification Search
None
See application file for complete search history.

(56) References Cited

U.S. PATENT DOCUMENTS

| | | | |
|---|---|---|---|
| 6,396,940 B1 | 5/2002 | Carrott et al. | |
| 8,073,290 B2 | 12/2011 | Vomweg et al. | |
| 8,379,955 B2 | 2/2013 | McKenzie et al. | |
| 8,781,202 B2* | 7/2014 | Gleichman | G06T 7/0012 382/131 |
| 2010/0286517 A1* | 11/2010 | Kamen | A61B 10/0241 600/438 |
| 2012/0172700 A1 | 7/2012 | Krishnan et al. | |
| 2012/0323118 A1* | 12/2012 | Menon Gopalakrishna | A61B 6/463 600/431 |

FOREIGN PATENT DOCUMENTS

| | | |
|---|---|---|
| KR | 10-0466409 B1 | 1/2005 |
| WO | WO 02/41767 A1 | 5/2002 |

* cited by examiner

*Primary Examiner* — Shefali Goradia
(74) *Attorney, Agent, or Firm* — Jefferson IP Law, LLP

(57) ABSTRACT

An apparatus and method thereof include an observation map generator configured to generate a three-dimensional (3D) observation map based on display frequency and/or display duration of a cross-sectional image of a 3D volume image, wherein the 3D observation map three-dimensionally represents degrees of interest for each voxel of the 3D volume image. The apparatus also includes a region of interest marker configured to mark a region of interest.

20 Claims, 8 Drawing Sheets

APPARATUS AND METHOD FOR MARKING REGION OF INTEREST

CROSS-REFERENCE TO RELATED APPLICATION(S)

This application claims the benefit under 35 U.S.C. §119(a) from Korean Patent Application No. 10-2014-0000321, filed on Jan. 2, 2014, in the Korean Intellectual Property Office, the entire disclosure of which is incorporated herein by reference for all purposes.

BACKGROUND

1. Field

The following description relates to an image processing apparatus, and more particularly, to an image processing apparatus and method thereof for marking regions of interest.

2. Description of Related Art

With the development of image processing technologies, three-dimensional (3D) volume images are used to diagnose diseases in the human body. In most cases, doctors observe these 3D volume images without marking a region of interest. When doctors wish to observe the region of interest again, the doctors have to conduct the examination of the entire 3D image again to be able to find the region of interest. This raises a problem in that it is difficult for them to find the region again in the 3D volume image. Also, if multiple regions of interest are important, there is a chance that at least one region may be missed in a subsequent examination. It is harder to find a desired region of interest in a 3D volume image than in a two dimensional image.

Further, when using a 3D volume image to diagnose diseases in the human body, doctors usually observe a 2D cross-sectional image related to a 3D volume image, instead of directly observing the 3D volume image. Therefore, image processing apparatus and method thereof to effectively enable the marking regions of interest are needed.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In accordance with an embodiment, there is provided an an observation map generator configured to generate a three-dimensional (3D) observation map based on display frequency and/or display duration of a cross-sectional image of a 3D volume image, wherein the 3D observation map three-dimensionally represents degrees of interest for each voxel of the 3D volume image; and a region of interest marker configured to mark a region of interest.

The at least one cross-sectional image may include at least one image among a sagittal image of a sagittal plane, a coronal image of a coronal plane, and an axial image of an axial plane.

In response to a displayed cross-sectional image being changed, the observation map generator may increase degrees of interest of all voxels of the 3D volume image, the voxels corresponding to the changed cross-sectional image.

The observation map generator may generate the 3D observation map so that regions of the 3D observation map have different colors according to degrees of interest of the voxels.

The observation map generator may generate a 3D observation map including a shape identical to the 3D volume image.

The observation map generator may generate the 3D observation map based on display duration of a cross-sectional image of the 3D volume image.

In response to a displayed cross-sectional image being changed, the observation map generator may generate the 3D observation map by increasing by Δt each degree of interest of all voxels, which correspond to a changed cross-sectional image of a 3D volume image, wherein Δt is the display duration of a cross-sectional image.

The region of interest marker may include a segmenter configured to segment regions of the 3D observation map; a degree of interest calculator configured to calculate degrees of interest for each of the segmented regions; a region selector configured to select, based on the calculated degrees of interest, at least one region among the segmented regions according to predetermined criteria; and a marker configured to select, as a region of interest, at least one region of the 3D volume image, which corresponds to the at least one region selected from among the segmented regions, to mark the selected region of interest in the 3D volume image.

The degree of interest calculator may calculate degrees of interest for each of the segmented regions by adding up degrees of interest for each voxel of each of the segmented regions.

The predetermined criteria may include at least one selection among selection of a number of regions in an order of degrees of interest from highest to lowest, a selection of a region with a degree of interest being equal to or greater than a threshold, or a selection of a region with the highest degree of interest.

In accordance with another embodiment, there is provided a method, including generating a three-dimensional (3D) observation map based on display frequency and/or display duration of at least one cross-sectional image of a 3D volume image, wherein the 3D observation map three-dimensionally represents degrees of interest for each voxel of the 3D volume image; and marking a region of interest in the 3D volume image based on the generated 3D observation map.

The at least one cross-sectional image may include at least one image among a sagittal image of a sagittal plane, a coronal image of a coronal plane, and an axial image of an axial plane.

The generating of the 3D observation map may include, in response to a displayed cross-sectional image being changed, increasing degrees of interest for all voxels, which correspond to the changed cross-sectional image of the 3D volume image.

The generating of the 3D observation map may include generating a 3D observation map so that regions of the 3D observation map have different colors according to degrees of interest of the voxels.

The generating of the 3D observation map may include generating the 3D observation map including a shape identical to the 3D volume image.

The marking of the region of interest may include segmenting regions of the 3D observation map; calculating degrees of interest for each of the segmented regions; based on the calculated degrees of interest, selecting at least one region from among the segmented regions according to predetermined criteria; and selecting, as a region of interest, at least one region of the 3D volume image, which corresponds to the at least one region selected from among the segmented regions, and marking the selected region of interest in the 3D volume image.

The calculating of the degrees of interest may include calculating degrees of interest for each of the segmented regions by adding up degrees of interest for each voxel of each of the segmented regions.

The predetermined criteria may include at least one selection among selection of a number of regions in order of degrees of interest from highest to lowest, a selection of a region with a degree of interest being equal to or greater than a threshold, or a selection of a region with the highest degree of interest.

In response to a displayed cross-sectional image being changed, generating the 3D observation map by increasing by $\Delta t$ each degree of interest of all voxels, which correspond to a changed cross-sectional image of a 3D volume image, wherein $\Delta t$ is the display duration of a cross-sectional image.

In accordance with an embodiment, there is provided a computer program embodied on a non-transitory computer readable medium, the computer program being configured to control a processor to perform the method described above.

Other features and aspects may be apparent from the following detailed description, the drawings, and the claims.

BRIEF DESCRIPTION OF THE DRAWINGS

These and/or other aspects will become apparent and more readily appreciated from the following description of the embodiments, taken in conjunction with the accompanying drawings in which.

Figure 1:
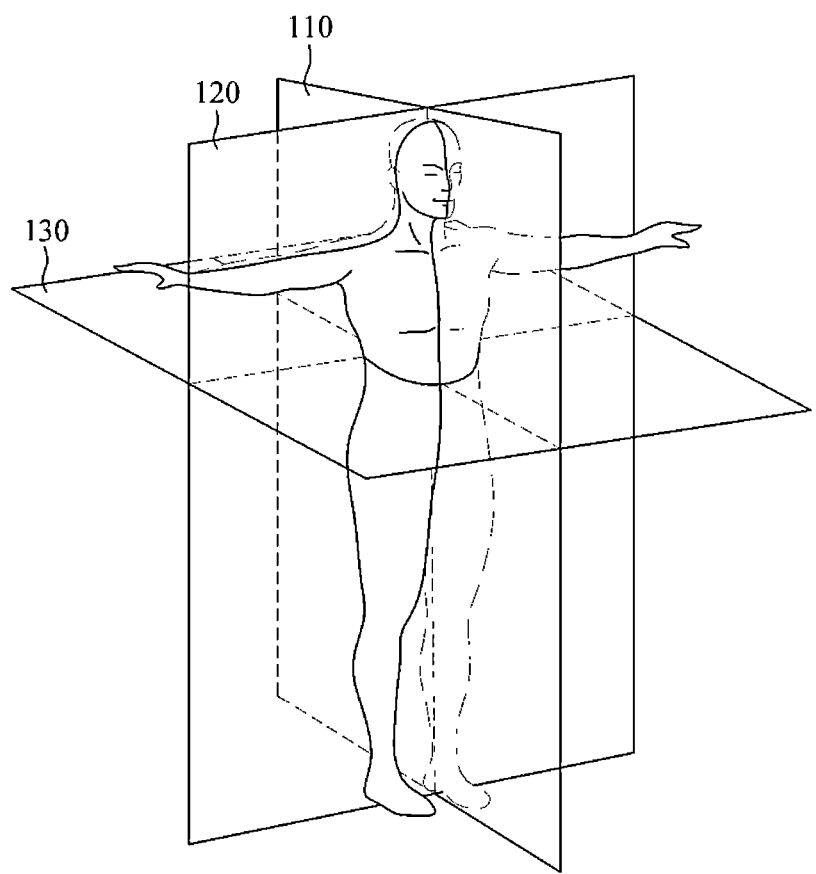
FIG. 1 is a diagram illustrating an example of standard planes, according with an embodiment.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness. As used herein, the term "and/or" includes any and all combinations of one or more of the associated listed items.

FIG. 1 is a diagram illustrating an example of standard planes, according to an embodiment.

For convenience, FIG. 1 illustrates a case where a subject is a human body, but the subject is not limited thereto. As an alternative, the subject may be an animal.

Referring to FIG. 1, the standard planes include a sagittal plane 110, a coronal plane 120, and an axial plane 130. The axial plane 130 may be referred to as a transverse plane or a horizontal plane.

The sagittal plane 110 is a vertical plane that passes from ventral to dorsal, dividing the body into right and left halves. The coronal plane 120 is a vertical plane that divides the body into front and rear sections, and the axial plane 130 is any plane that is parallel to a ground surface, and divides the body into superior and inferior parts. Although FIG. 1 illustrates the sagittal plane 110, the coronal plane 120, and the axial plane 130 at a corresponding central plane of the body, each of the sagittal plane 110, the coronal plane 120, and the axial plane 130 may divide the body at any predetermined axis on a single corresponding plane. The front of the subject refers to a face side of the subject.

Also, without being limited to the sagittal plane 110, the coronal plane 120, and the axial plane 130, the standard planes may further include other planes according to an embodiment.

Further, FIG. 1 illustrates one sagittal plane 110, one coronal plane 120, and one axial plane 130, but the number of each of the planes is not limited thereto, and multiple planes, each parallel to and associated with at least one of the sagittal plane 110, the coronal plane 120, and the axial plane 130 illustrated in FIG. 1 may be included, according to an embodiment.

In one example, it is assumed that an axis that connects the right side and the left side of the subject is an X axis, an axis that connects the front and the rear sections of the subject is a Y axis, and an axis that connects the superior and the inferior parts of the subject is a Z axis.

In this case, the sagittal plane 110 corresponds to a YZ plane, the coronal plane 120 to an XZ plane, and the axial plane 130 to an XY plane.

Figure 2:
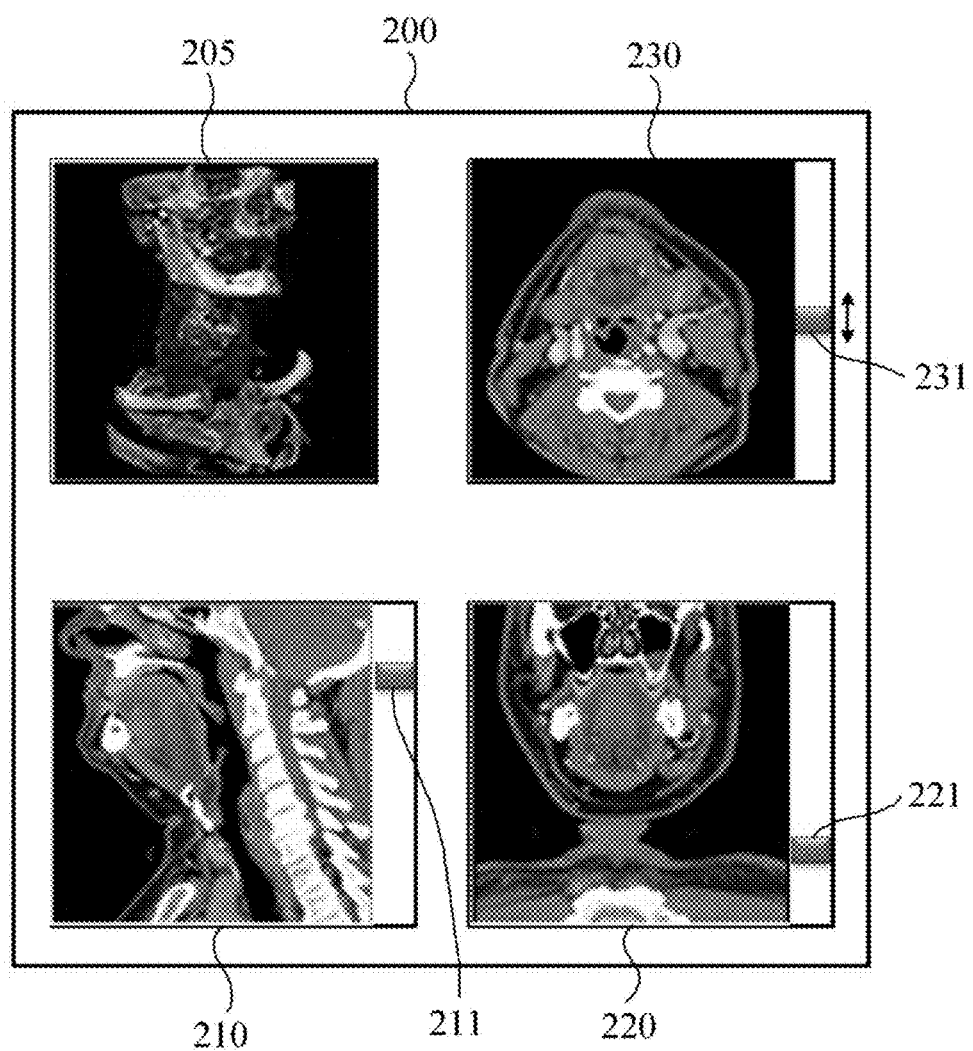
FIG. 2 is a diagram illustrating an example of a display screen for an analysis of a 3D volume image, according to another embodiment.

FIG. 2 is a diagram illustrating an example of a display screen for an analysis of a 3D volume image, according to another embodiment.

Referring to FIG. 2, the display screen 200 includes a 3D volume region 205, a sagittal region 210, a coronal region 220, and an axial region 230. A 3D volume image is displayed in the 3D volume region 205, a cross-sectional image of the sagittal plane 110 (hereinafter referred to as a sagittal image) is displayed in the sagittal region 210, a cross-sectional image of the coronal plane 120 (hereinafter referred to as a coronal image) is displayed in the coronal region 220, and a cross-sectional image of the axial plane 130 (hereinafter referred to as an axial image) is displayed in the axial region 230.

Further, scroll bars 211, 221, and 231 are displayed on a side of the sagittal region 210, the coronal region 220, and the axial region 230 along with respective cross-sectional images.

A user uses the scroll bars 211, 221, and 231 to change values of axes (hereinafter referred to as axis values) that pass through each plane. In response to each axis value being changed by the scroll bars 211, 221, and 231, cross-sectional images corresponding to changed axis values are displayed in the respective regions 210, 220, and 230.

For example, as an X axis passes through the sagittal plane 110, if a user changes an X axis value using the scroll bar 211, a sagittal image corresponding to a changed X axis value is displayed in the sagittal region 210. As a Y axis passes through the coronal plane 120, if a user changes a Y axis value using the scroll bar 221, a coronal image corresponding to a changed Y axis value is displayed in the coronal region 220. As a Z axis passes through the axial plane 130, if a user changes a Z axis value using the scroll bar 231, an axial image corresponding to a changed Z axis value is displayed in the axial region 230.

The display screen example in FIG. 2 is merely illustrative, and any other display screen may also be provided. For example, each of the regions 205, 210, 220, and 230 may be displayed in a separate window or on a separate screen. Each of the regions 205, 210, 220, and 230 may be displayed by being re-arranged differently from the example in FIG. 2.

Further, the scroll bars 211, 221, and 231 are used as a user interface to change each axis value, but the user interface is not limited thereto, and various other user interfaces may also be used.

Figure 3:
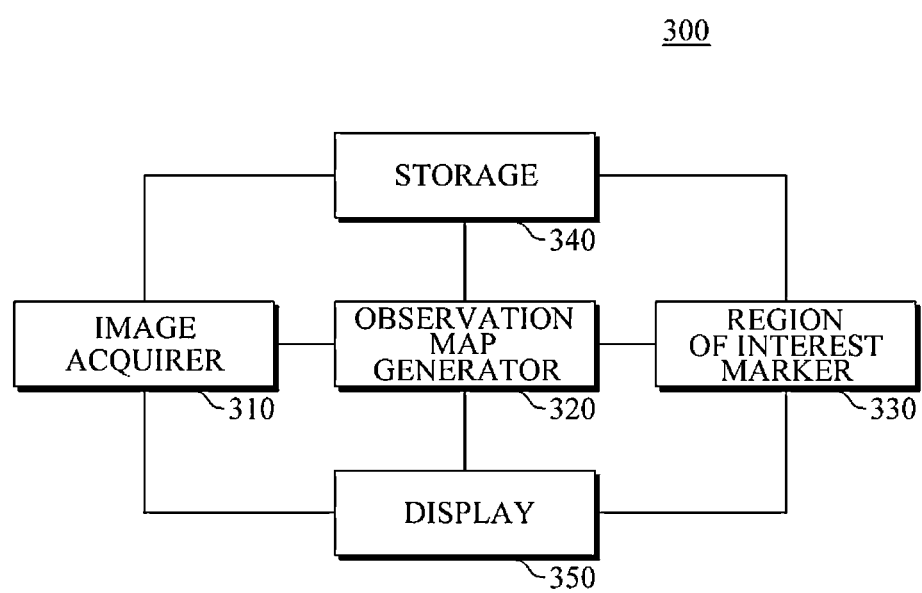
FIG. 3 is a block diagram illustrating an example of an apparatus for marking a region of interest, according to an embodiment.

FIG. 3 is a block diagram illustrating an example of an apparatus for marking a region of interest, according to an embodiment.

Referring to FIG. 3, the apparatus 300 for marking a region of interest includes an image acquirer 310, an observation map generator 320, a region of interest marker 330, a storage 340, and a display 350.

The image acquirer 310 acquires a 3D volume image and cross-sectional images of the 3D volume image, in which the 3D volume image is a 3D medical image that is created by photographing a whole or a portion of a subject. A cross-sectional image is an image that represents a cross section of a 3D volume image at one or more standard planes, such as a sagittal plane, a coronal plane, and/or an axial plane. The standard plane refers to a plane that serves as a standard for cutting a 3D volume image. The standard plane is described in detail with reference to FIG. 1 above.

The image acquirer 310 acquires the 3D volume image and the cross-sectional images using various methods.

For example, the image acquirer 310 acquires at least one image by photographing a subject, and creates a 3D volume image and cross-sectional images thereof based on the acquired image. In this case, the image acquirer 310 includes one or more devices including, but not limited to, a computed tomography (CT) device, a magnetic resonance imaging (MRI) device, an X-ray device, a positron emission tomography (PET) device, a single photon emission computed tomography (SPECT), or an ultrasonic diagnosis device.

In another example, the image acquirer 310 receives from an external device at least one image stored in the external device, and creates the 3D volume image and the cross-sectional images thereof based on the received image.

In still another example, the image acquirer 310 also receives the 3D volume image and the cross-sectional images thereof from an external device.

The above examples are merely illustrative to explain various methods used by the image acquirer 310 to acquire the 3D volume image and the cross-sectional images thereof, and the method of acquiring these images is not limited thereto.

Based on display information about at least one displayed cross-sectional image of a 3D volume image, the observation map generator 320 generates a 3D observation map that three-dimensionally represents degrees of interest for each voxel of a 3D volume image. In one example, the display information includes display frequency, display duration, and the like.

According to an embodiment, the observation map generator 320 generates a 3D observation map based on display frequency of at least one cross-sectional image of a 3D volume image. For example, assuming that a cross-sectional image is changed along a Z axis, and the cross-sectional image that is currently being displayed is positioned at z1 of the Z axis, the observation map generator 320 generates a 3D observation map using the following Equation 1.

$$g(x,y,z)=g1(x,y,z)+1, \text{ at } z=z1 \text{ (for all } x,y) \quad \text{[Equation 1]}$$

Herein, g1(x, y, z) represents a 3D observation map before updating, and g(x, y, z) represents a 3D observation map after updating, in which g(x, y, z) represents degrees of interest of voxels corresponding to coordinates (x, y, z). In this case, the operation of updating 3D observation map using Equation 1 is performed each time a displayed cross-sectional image is changed. In other words, each time a displayed cross-sectional image is changed, the observation map generator 320 generates a 3D observation map by increasing by 1 each degree of interest of all voxels, which correspond to a changed cross-sectional image of a 3D volume image.

In another example, the observation map generator 320 generates a 3D observation map based on display duration of at least one cross-sectional image of a 3D volume image. For example, assuming that a cross-sectional image is changed along a Z axis, and the Z axis in the cross-sectional image that is currently being displayed is positioned at z1, the observation map generator 320 may generate a 3D observation map using the following Equation 2.

$$g(x,y,z)=g1(x,y,z)+\Delta t, \text{ at } z=z1 \text{ (for all } x,y) \quad \text{[Equation 2]}$$

Herein, g1(x, y, z) represents a 3D observation map before updating, g(x, y, z) represents a 3D observation map after updating, and $\Delta t$ represents the display duration of a cross-sectional image, in which the operation of updating 3D observation map using Equation 2 is performed each time a displayed cross-sectional image is changed. In other words, each time a displayed cross-sectional image is changed, the observation map generator 320 generates a 3D observation map by increasing by $\Delta t$ each degree of interest of all voxels, which correspond to a changed cross-sectional image of a 3D volume image.

In one illustrative example, $\Delta t$ is obtained from information about movements of a scroll bar used to change a displayed cross-sectional image and the display duration is also directly measured using a timer.

In another example, the observation map generator 320 generates a 3D observation map based on display frequency and display duration of at least one cross-sectional image of a 3D volume image. For example, assuming that a cross-sectional image is changed along a Z axis, and the Z axis in the cross-sectional image that is currently being displayed is positioned at z1, the observation map generator 320 generates a 3D observation map using the following Equation 3.

$$g(x,y,z)=g1(x,y,z)+a+b\Delta t, \text{ at } z=z1 \text{ (for all } x,y) \quad \text{[Equation 3]}$$

Herein, g1(x, y, z) represents a 3D observation map before updating, g(x, y, z) represents a 3D observation map after updating, $\Delta t$ represents the display duration of a cross-sectional image, and a and b represent specific weighted values, in which the operation of updating 3D observation map using Equation 3 is performed each time a displayed cross-sectional image is changed.

In other words, each time a displayed cross-sectional image is changed, the observation map generator 320 generates a 3D observation map by increasing by a+bΔt each degree of interest of all voxels, which correspond to a changed cross-sectional image of a 3D volume image.

Figure 5:
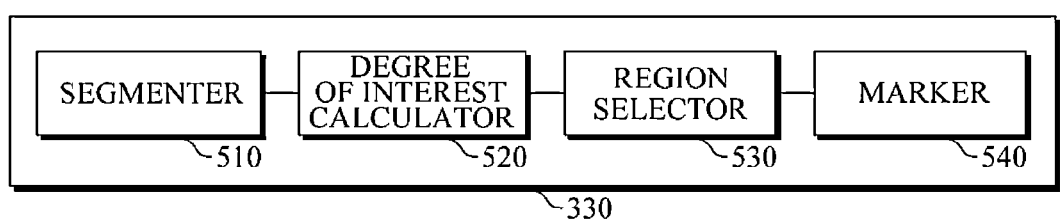
FIG. 5 is a detailed block diagram illustrating an example of the region of interest marker of FIG. 3, according to an embodiment.

The region of interest marker 330 marks a region of interest (ROI) in a 3D volume image based on a 3D observation map generated by the observation map generator 320. For example, the region of interest marker 330 selects at least one region in the 3D observation map according to predetermined criteria. Further, the region of interest marker 330 selects, as a region of interest, at least one region of a 3D volume image, which corresponds to at least one region selected from the 3D observation map. The region of interest marker 330 also marks the selected region of interest on the 3D volume image. The region of interest marker 330 are illustrated in FIG. 5 and discussed in greater detail below.

A storage 340 stores the 3D volume image and cross-sectional images. Further, the storage 340 stores the 3D observation map generated by the observation map generator 320.

As an example, the storage 340 includes at least one type of a storage medium among flash memory type, hard disk type, multi-media card micro type, card type memory (e.g. SD or XD memory, etc.), random access memory (RAM), static random access memory (SRAM), read-only memory (ROM), electrically erasable programmable read only memory (EEPROM), programmable read only memory (PROM), magnetic memory, magnetic disks, optical discs, or the like. In one configuration, the storage 340 is a separate storage server from the apparatus 300 and is connected to a network. In another configuration, the storage 340 is part of the apparatus 300.

The display 350 displays the 3D volume image and the cross-sectional images. In one configuration, the display 350 is external to the apparatus 300 and is connected to a network. The apparatus 300 would wire or wireless transmits the 3D volume image and the cross-sectional images to the display 350. In another configuration, the display 350 is part of the apparatus 300. A method of displaying a 3D volume image and cross-sectional images is substantially the same as the method described above with reference to FIG. 2, and thus an overlapping description thereof will be omitted.

Further, the display 350 displays the 3D volume image in which a region of interest is marked.

According to an embodiment, the display 350 displays both the 3D observation map and the 3D volume image by overlaying the 3D volume image with the 3D observation map.

In one example, the display 350 includes a liquid crystal display, a thin film transistor liquid crystal display, an organic light emitting diode, a flexible display, a transparent display, a 3D display, and the like, and depending on examples, there may be two or more displays 350.

Further, according to an embodiment, the observation map generator 320 and the region of interest marker 330 illustrated in FIG. 3 are hardware controllers or microprocessors that execute program codes.

Figure 4A:
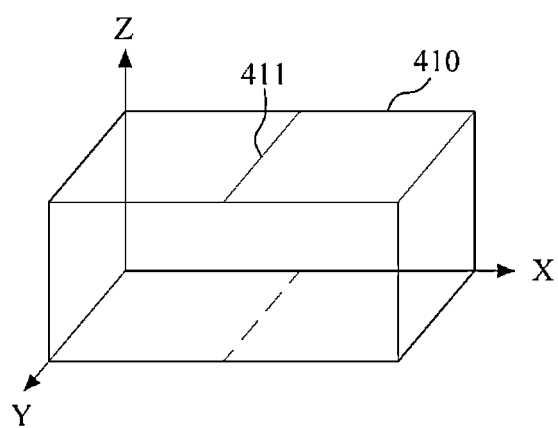
FIG. 4A is a diagram illustrating an example of marking a displayed cross-sectional image in a 3D volume image, according with an embodiment.
Figure 4B:
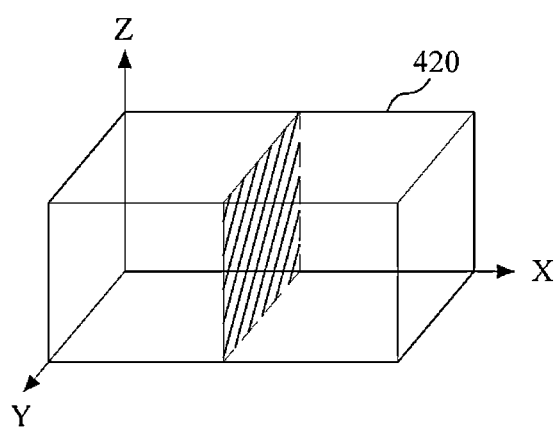
FIG. 4B is a diagram illustrating an example of a 3D observation map generated, according to an embodiment.

FIG. 4A is a diagram illustrating an example of marking a displayed cross-sectional image in a 3D volume image, and FIG. 4B is a diagram illustrating an example of a 3D observation map generated, according to an embodiment.

Referring to FIGS. 4A and 4B, in a case where a cross-sectional image 411 is displayed in a 3D volume image 410, the observation map generator 320 generates a 3D observation map 420 based on display information about the displayed cross-sectional image 411, in which the 3D observation map 420 has a form or a shape identical to the 3D volume image 410. Each region of the 3D observation map 420 has different colors according to degrees of interest of each voxel, which are calculated by the observation map generator 320.

FIG. 5 is a detailed block diagram illustrating an example of the region of interest marker of FIG. 3, according to an embodiment.

Referring to FIG. 5, the region of interest marker 330 includes a segmenter 510, a degree of interest calculator 520, a region selector 530, and a marker 540.

The segmenter 510 uses an image segmentation algorithm to segment regions of 3D observation map generated by the observation map generator 320, in which the image segmentation algorithm is an algorithm for segmenting regions or objects.

For example, the segmenter 510 segments a 3D volume image using a discontinuity-based segmentation method, or a similarity-based segmentation method. Important sections of an image are generally distinguished by brightness, and thus, most segmentation methods are based on discontinuity or similarity, the two basic features of brightness. A segmentation method based on discontinuity is a method of segmenting an image based on a sudden change in brightness, such as a contour of an image, and is used to divide boundary features, such as dots, lines and edges, in segmented regions. That is, segmentation of a desired region based on discontinuity is performed by dividing these boundary features. A segmentation method based on similarity is a method in which dots of similar brightness are collected to segment regions according to brightness similarity. Examples thereof include a thresholding method, a region growing method, a region splitting and merging method, a morphological watershed method, and other similar methods.

The degree of interest calculator 520 calculates degrees of interest for each segmented region of a 3D observation map. For example, the degree of interest calculator 520 calculates degrees of interest for each segmented region by adding up degrees of interest of voxels in each segmented region.

Based on degrees of interest in each segmented region, the region selector 530 selects at least one region in a 3D observation map according to predetermined criteria, which include selecting a specific number of regions in order of degrees of interest from highest to lowest, selecting a region with a degree of interest being a specific threshold or above, or selecting a region with the highest degree of interest.

The marker 540 selects, as a region of interest, at least one region of a 3D volume image, which corresponds to at least one region selected by the region selector 530, and marks the selected region of interest in a 3D volume image.

Figure 6:
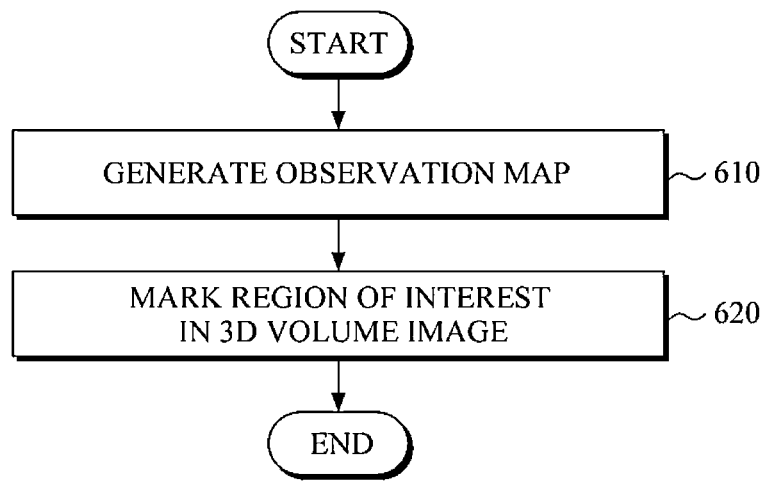
FIG. 6 is a flowchart illustrating an example of a method for marking a region of interest, according to an embodiment.

FIG. 6 is a flowchart illustrating an example of a method for marking a region of interest, according to an embodiment.

Referring to FIG. 6, a method of marking a region of interest includes, at operation 610, generating a 3D observation map that three-dimensionally represents degrees of interest of each voxel of a 3D volume image. For example, the apparatus 300 for marking a region of interest generates a 3D observation map based on display information about at least one cross-sectional image, in which the display information includes display frequency, display duration, and other parameters. The apparatus 300 for marking a region of interest generates a 3D observation map using at least one among Equation 1, Equation 2, and Equation 3, described above.

Subsequently, in operation 620, based on a 3D observation map generated in 610, the method marks a region of interest (ROI) a 3D volume image. For example, the apparatus 300 for marking a region of interest selects at least one region from a 3D observation map according to predetermined criteria, and extracts from the 3D volume image at least one region corresponding to the at least one region selected from the 3D observation map, to mark the extracted region as a region of interest.

Figure 7:
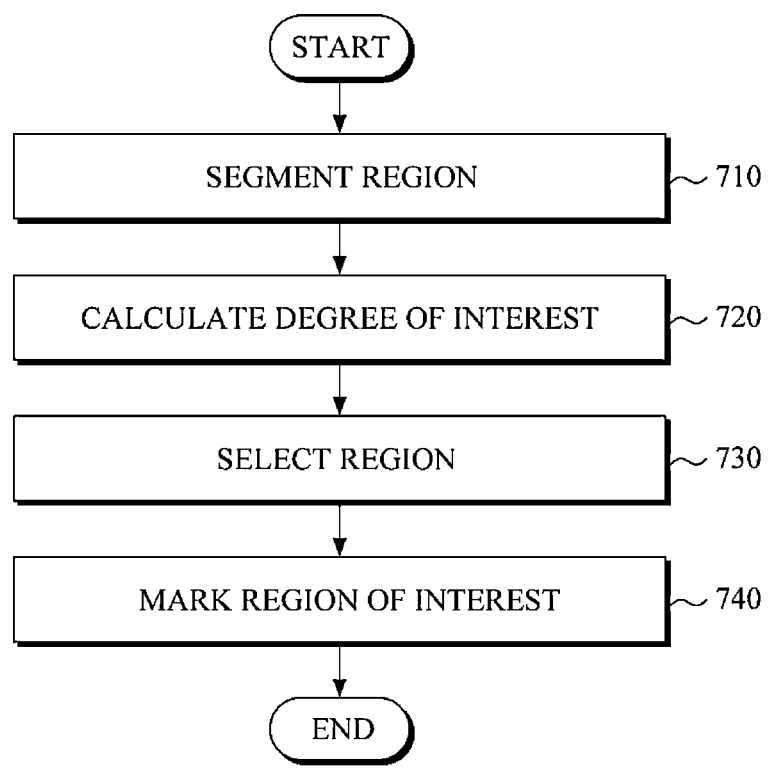
FIG. 7 is a detailed flowchart illustrating the marking of a region of interest in FIG. 6, according to an embodiment.

FIG. 7 is a detailed flowchart illustrating the marking of a region of interest in FIG. 6, in according to an embodiment.

Referring to FIG. 7, at operation 710, a method of marking a region of interest using a 3D observation map includes segmenting regions of a 3D observation map. For example, the region of interest marker 330 uses various image segmentation algorithms to segment regions of a 3D observation map.

Then, at operation 720, degrees of interest for each segmented region of a 3D observation map are calculated. For example, the degree of interest calculator 520 calculates degrees of interest for each segmented region by adding up degrees of interest of voxels in each segmented region.

Thereafter, based on calculated region observation values, at operation 730, the method selects at least one region from a 3D observation map. For example, based on calculated region observation values, the region of interest marker 330 selects at least one region from a 3D observation map according to predetermined selection criteria. The predetermined selection criteria includes selecting a specific number of regions in order of highest to lowest region observation values, selecting a region with a region observation value being a specific threshold or above, and/or selecting a region with the highest region observation value.

Then, at operation 740, the method selects at least one region of a 3D volume image, which corresponds to the at least one region selected from the 3D observation map, as a region of interest to be marked in a 3D volume image.

It is to be understood that in the embodiment of the present invention, the operations in FIGS. 6-7 are performed in the sequence and manner as shown although the order of some operations and the like may be changed without departing from the spirit and scope of the described configurations. In accordance with an illustrative example, a computer program embodied on a non-transitory computer-readable medium may also be provided, encoding instructions to perform at least the method described in FIGS. 6-7.

Program instructions to perform a method described in FIG. 6-7, or one or more operations thereof, may be recorded, stored, or fixed in one or more computer-readable storage media. The program instructions may be implemented by a computer. For example, the computer may cause a processor to execute the program instructions. The media may include, alone or in combination with the program instructions, data files, data structures, and the like. Examples of computer-readable media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The program instructions, that is, software, may be distributed over network coupled computer systems so that the software is stored and executed in a distributed fashion. For example, the software and data may be stored by one or more computer readable recording mediums. Also, functional programs, codes, and code segments for accomplishing the example embodiments disclosed herein may be easily construed by programmers skilled in the art to which the embodiments pertain based on and using the flow diagrams and block diagrams of the figures and their corresponding descriptions as provided herein.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An apparatus, comprising:
a processor configured to:
generate a three-dimensional (3D) observation map based on at least one of display frequency and display duration of at least one cross-sectional image of a 3D volume image, wherein the 3D observation map three-dimensionally represents degrees of interest for each voxel of the 3D volume image; and
mark a region of interest.

2. The apparatus of claim 1, wherein the at least one cross-sectional image comprises at least one image among a sagittal image of a sagittal plane, a coronal image of a coronal plane, and an axial image of an axial plane.

3. The apparatus of claim 1, wherein, in response to a displayed cross-sectional image being changed, the processor is further configured to increase degrees of interest of all voxels of the 3D volume image, the voxels corresponding to the changed cross-sectional image.

4. The apparatus of claim 1, wherein the processor is further configured to generate the 3D observation map so that regions of the 3D observation map have different colors according to degrees of interest of the voxels.

5. The apparatus of claim 1, wherein the processor is further configured to generate the 3D observation map comprising a shape identical to the 3D volume image.

6. The apparatus of claim 1, wherein the processor is further configured to generate the 3D observation map based on the display duration of the at least one cross-sectional image of the 3D volume image.

7. The apparatus of claim 1, wherein in response to a displayed cross-sectional image being changed, the processor is further configured to generate the 3D observation map by increasing by $\Delta t$ each degree of interest of all voxels, which correspond to the changed cross-sectional image of the 3D volume image, wherein $\Delta t$ is the display duration of the changed cross-sectional image.

8. The apparatus of claim 1, wherein the processor comprises:
a segmenter configured to segment regions of the 3D observation map;
a degree of interest calculator configured to calculate degrees of interest for each of the segmented regions;

a region selector configured to select, based on the calculated degrees of interest, at least one region among the segmented regions according to predetermined criteria; and a marker configured to select, as a region of interest, at least one region of the 3D volume image, which corresponds to the at least one region selected from among the segmented regions, to mark the selected region of interest in the 3D volume image.

9. The apparatus of claim 8, wherein the degree of interest calculator calculates degrees of interest for each of the segmented regions by adding up degrees of interest for each voxel of each of the segmented regions.

10. The apparatus of claim 8, wherein the predetermined criteria comprises at least one selection among selection of a number of regions in an order of degrees of interest from highest to lowest, a selection of a region with a degree of interest being equal to or greater than a threshold, or a selection of a region with the highest degree of interest.

11. A method, comprising:
generating a three-dimensional (3D) observation map based on at least one of display frequency and display duration of at least one cross-sectional image of a 3D volume image, wherein the 3D observation map three-dimensionally represents degrees of interest for each voxel of the 3D volume image; and
marking a region of interest in the 3D volume image based on the generated 3D observation map.

12. The method of claim 11, wherein the at least one cross-sectional image comprises at least one image among a sagittal image of a sagittal plane, a coronal image of a coronal plane, and an axial image of an axial plane.

13. The method of claim 11, wherein the generating of the 3D observation map comprises, in response to a displayed cross-sectional image being changed, increasing degrees of interest for all voxels, which correspond to the changed cross-sectional image of the 3D volume image.

14. The method of claim 11, wherein the generating of the 3D observation map comprises generating the 3D observation map so that regions of the 3D observation map have different colors according to degrees of interest of the voxels.

15. The method of claim 11, wherein the generating of the 3D observation map comprises generating the 3D observation map comprising a shape identical to the 3D volume image.

16. The method of claim 11, wherein the marking of the region of interest comprises:
segmenting regions of the 3D observation map;
calculating degrees of interest for each of the segmented regions;
based on the calculated degrees of interest, selecting at least one region from among the segmented regions according to predetermined criteria; and
selecting, as a region of interest, at least one region of the 3D volume image, which corresponds to the at least one region selected from among the segmented regions, and marking the selected region of interest in the 3D volume image.

17. The method of claim 16, wherein the calculating of the degrees of interest comprises calculating degrees of interest for each of the segmented regions by adding up degrees of interest for each voxel of each of the segmented regions.

18. The method of claim 16, wherein the predetermined criteria comprises at least one selection among selection of a number of regions in order of degrees of interest from highest to lowest, a selection of a region with a degree of interest being equal to or greater than a threshold, or a selection of a region with the highest degree of interest.

19. The method of claim 11, wherein in response to a displayed cross-sectional image being changed, generating the 3D observation map by increasing by $\Delta t$ each degree of interest of all voxels, which correspond to the changed cross-sectional image of the 3D volume image, wherein $\Delta t$ is the display duration of the changed cross-sectional image.

20. A computer program embodied on a non-transitory computer readable medium, the computer program being configured to control a processor to perform the method of claim 11.

* * * * *